June 30, 1931.  C. A. ANDREE  1,812,030
ACOUSTOMETER
Filed Sept. 13, 1929
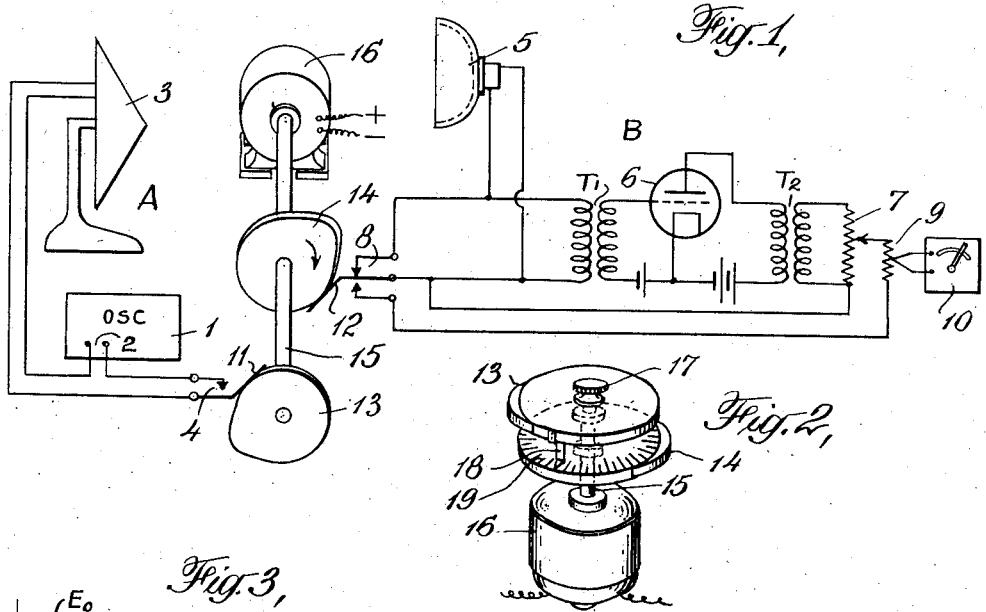
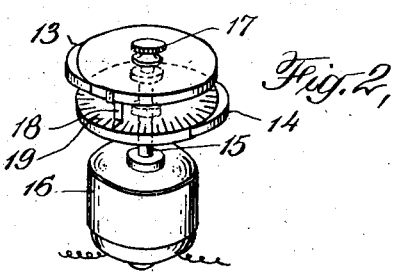
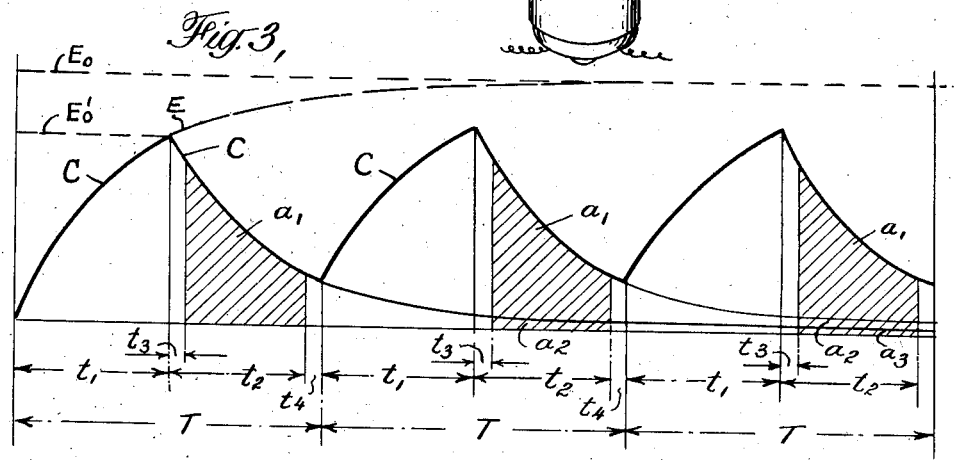
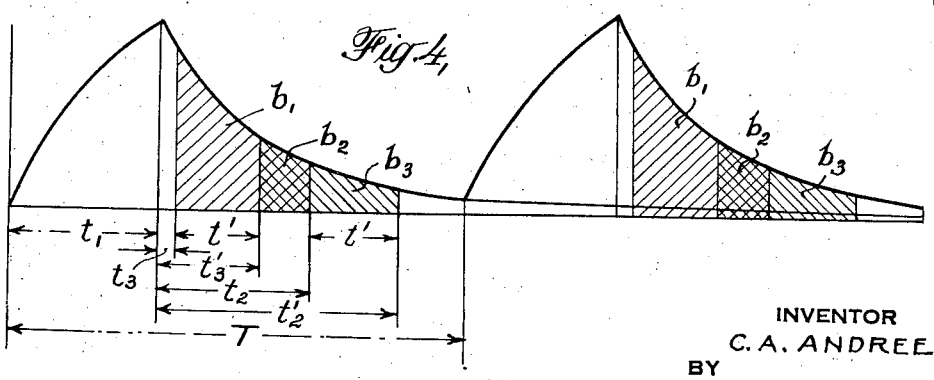
INVENTOR
C. A. ANDREE
BY
Pennie, Davis, Marvin & Edmonds,
ATTORNEYS Patented June 30, 1931

1,812,030

UNITED STATES PATENT OFFICE

CLARENCE A. ANDREE, OF MADISON, WISCONSIN, ASSIGNOR TO C. F. BURGESS LABORATORIES, INC., OF MADISON, WISCONSIN, A CORPORATION OF DELAWARE

ACOUSTOMETER

Application filed September 13, 1929. Serial No. 392,350.

This invention relates to methods and apparatus for measuring sound intensities and more particularly to the application of such methods and apparatus for determining the period of reverberation of a room, auditorium, or the like. The invention disclosed herein represents an improvement over that set forth in U. S. patents to R. F. Norris, No. 1,712,515 and 1,712,516.

An object of the invention is to provide a simple method and apparatus for quickly and accurately determining the period of reverberation of a room which does not depend upon the human ear.

A further object is to provide an arrangement for determining directly the curve showing the intensity of sound in a room at any instant during the building up or decay of a sound therein.

A further object is to provide an arrangement for determining the period of reverberation of a room wherein the emitting sound source utilized for such determination is intermittent rather than sustained as is the case for previous apparatus utilized for this purpose. One advantage of the intermittent over the sustained sound source is that the former more nearly simulates speech which necessarily is of a fluctuating nature.

A furthur object is to provide a method for determining the sound intensities at various points about a room under conditions wherein the intensities are either continuously building up or decaying.

A further object is to provide means for overcoming sound patterns or interference phenomena while making sound measurements.

A further object is to provide a sound measuring arrangement of the type described, wherein the apparatus used does not need to retain a constant intensity between tests for the reason that during each sound measurement the calibration of the device is automatic and contained within the method of making the sound measurements.

In practicing the invention, an acoustometer, such as that described in the Norris patents above referred to, is employed with certain modifications and additional attachments as hereinafter pointed out. In the Norris patents referred to, the period of reverberation of a room is calculated from the results of measurements made to determine the maximum intensity to which a sustained sound of known acoustical power rises when emitted from a constant source in a room, auditorium or the like under test. In order to compute the reverberation from such measurements, the volume of the room together with its sound absorbing value must first be determined. In the approved method of the present invention, the period of reverberation is determined by measurements of the average intensity of residual sound over a predetermined portion of the period during which an emitted sound is decaying in the room. The calculation of the reverberation from measurements made in this way is much simpler than with that of the Norris disclosure since the sound absorbing value and the volume of the room need not be known in order to determine the desired constant.

The invention will be best understood by reference to the drawings of which Fig. 1 shows in circuit diagram form a sketch of the improved sound emitting and measuring apparatus which combination is commonly termed an "acoustometer".

Fig. 2 shows one form of rotary device suitable for actuating certain switches associated with the sound emitting and pick-up apparatus for rendering the same simultaneously or alternately operative for suitable time intervals.

Fig. 3 is a graph showing the variation of sound intensity in a room at successive instants during progress of the sound measurement which is utilized in explaining the improved operation of the acoustometer.

Fig. 4 is a modified graph similar in scope to that of Fig. 3 but disclosing the analysis of the sound intensity in a room when the preferred method of sound measurement is utilized.

The acoustometer shown in Fig. 1 comprises the tone emitting unit A and the sound pick-up and indicating unit or sound meter B. The units A and B are constructed preferably as set forth in the Norris patents above referred to although other suitable apparatus could be used for this purpose.

The sound source A comprises an oscillator 1 for producing a sustained note, the power output of the oscillator being adjustable and connected by means of output terminals 2 to a loud speaker unit 3 through contacts of a switch 4.

The sound meter B comprises a pick-up device 5 such as an earphone, microphone or the like connected across the primary winding of an input transformer $T_1$, of a thermionic amplifier 6 (only one stage of which is shown) having an output transformer $T_2$ connected to the fixed portion of a potentiometer 7, the variable portion of which is connected through contacts of a switch 8 to a thermocouple 9 having its output connected to a current indicating meter 10. The switch 8 includes contacts for short circuiting the pick-up element 5 and the primary winding of input transformer $T_1$.

Switches 4 and 8 are provided with flexible elements 11 and 12 adapted to ride upon the peripheries of cams 13 and 14 respectively. These cams are affixed to a shaft 15 driven by a motor 16 the speed of which is adjustable to a desired value. The purpose of this arrangement is to render the sound source A and the sound meter B intermittently operative in order to measure sound intensities in accordance with the methods of the present invention.

The operation of motor 16 rotates shaft 15 and hence cams 13 and 14 at a uniform speed. Each time the bulging portion of cam 13 passes under the flexible member 11, switch 4 is closed connecting the oscillator 1 to loud speaker 3 and thus causing emission of tone for a short interval of time.

During the major portion of each cycle, element 12 rides upon the circular portion of cam 14 thus closing the upper contacts of switch 8 and opening the lower contacts. This short-circuits the input to amplifier 6 and also opens the circuit connecting potentiometer 7 to thermo-couple 9 thereby preventing delivery of current to indicating meter 10. During this interval therefore the meter 10 is rendered inoperative to acoustical vibrations.

As the bulging portion of cam 14 passes under element 12 the upper contacts of switch 8 are first opened removing the short circuit from the amplifier input and then the lower contacts of the switch are closed to connect the meter 10 to the amplifier output thereby rendering the circuit operative to measure the intensity of the sound waves impinging upon the pick-up device 5. Conditions are maintained thus for a brief time interval until the bulging portion of cam 14 passes beyond element 12 whereupon the lower contacts of switch 8 are first opened disconnecting the meter 10 to be followed by closure of the upper switch contacts which short circuits the amplifier input.

This cycle of operations has been traced in detail to bring out the fact that meter 10 is never connected to the amplifier while the short circuit is being applied to or removed from the amplifier input. This precaution is required to prevent transient electrical disturbances set up in the amplifier during such switching operations from affecting the meter and hence introducing errors in the readings obtained.

It is necessary to short circuit the input to the amplifier during the intervals that sound is being emitted from source B, since during such intervals the microphone 5 may be subjected to very intense sounds sufficient in magnitude to cause the voltages applied to the amplifier tubes to greatly exceed their normal operating range. Under such conditions the time required for the amplifier tubes to return to normal is then quite appreciable compared to the time of a cycle of operation and thus erroneous readings will be obtained on the meter.

The time intervals during which the sound source A and the sound meter B are operative are of course dependent upon the shape of the cams 13 and 14 and also on the speed of the motor 16. The operative time intervals may be varied proportionally by changing the motor speed which, as was stated, is adjustable. The relative time intervals during each cycle that the sound is emitted and measured are determined by adjusting the setting of cam 13 with respect to cam 14, means being associated with the cams whereby such adjustment may be easily accomplished.

One scheme for providing relative adjustment of the cams is shown in the detail of Fig. 2. Cam 13 may be rotated on shaft 15 relative to cam 14 by loosening the thumb nut 17. A pointer 18 affixed to cam 13 moves along a scale 19 marked on cam 14 as the cams are adjusted relatively in this manner permitting accurate setting of cam 13 for activating devices A and B respectively during desired intervals of a cycle. After being properly adjusted cam 13 is of course clamped in position by tightening up on nut 17.

The theory upon which the operation of the acoustometer depends is explained with reference to Figs. 3 and 4. If the sound emitting device A of Fig. 1 is started in operation in a room, auditorium or the like and the instantaneous sound intensities are plotted as ordinates against the corresponding times as abscissae starting from the moment the first sound is emitted by the source, a graph will be obtained similar to that shown by the heavy line C of Fig. 3. The interval $t_1$ of each cycle T indicates the sound intensity during the period that sound is emitted by source A, while the remaining interval of each cycle shows the intensity during the intermission period.

As has been demonstrated by W. C. Sabine, during the interval that a sustained note of constant intensity is emitted in a room, the acoustical energy therein builds up from zero along an exponential curve as expressed by the following equation.

$$(1) \quad E = E_0 \cdot \left[1 - e^{-\left(\frac{avst}{4d}\right)}\right]$$

Where:
$E$ = the energy level of the sound in the room at any instant.
$E_0$ = The maximum energy level to which a sustained sound will rise and to which value the curve E becomes asymptotic.
$d$ = volume of room in cubic feet.
$a$ = average absorption per unit of surface of room based on open window.
$s$ = surface of room in square feet.
$v$ = velocity of sound in air in feet per second.
$e$ = natural base logarithm.
$t$ = the time interval during which the not is emitted.

When the sound is stopped abruptly, the energy level in the room commences immediately to decrease and approach the axis of abscissæ as an asymptote as shown in Fig. 3 in response to the same law, that is, $$(2) \quad E = E_0 e^{-\left(\frac{avst}{4d}\right)}$$

The shape of the curves is therefore dependent upon th absorption units in the room and the volume of the room, or, in other words, the period of reverberation, which is equal to $$\frac{.05d}{a}.$$

The period of reverberation in acoustical measurement is defined as the time it takes for a sound to attenuate to $$\frac{1}{1,000,000}$$

of its original intensity. Therefore, if it is possible to measure the average energy and time at two or more points on either curve, it is possible to determine the period of reverberation mathematically.

The acoustometer does not respond immediately to changes in sound intensity due to the lag in the measuring instrument. This lag is advantageous in my improved method. If a sustained sound is emitted in a room for a certain interval and then cut off for a certain interval and the cycle repeated continuously each cycle being at most only of a few seconds duration, then it becomes possible to measure the average sound in the room for any definite period of the cycle by means of the lagging sound intensity indicator when used in conjunction with the previously described improved apparatus. If the measuring device is turned on only during a definite period of the total cycle, which is only at most of a few seconds duration, I have found that it becomes possible to read the average intensity of the sound prevailing during those periods. The lag of the instrument is sufficient to prevent the needle of the indicator 10 from swinging back appreciably toward the zero point.

It therefore becomes necessary to emit a rapid succession of sounds of short and equal duration, the intermission periods all being of short and equal duration. I have found that cycles varying from 1/5 to 5 seconds are suitable. This period is regulated by the variable-speed motor 16. The speed is varied for rooms of different sizes. A sufficient amount of time must be given the sound emitted by the loud speaker 1 to reach the walls of the room and reflect back to the pick-up device 5 before the measuring device is turned on. If this amount of time is not allowed, the acoustometer will not measure the value of the reflected sound, but rather will measure the value of the sound before th first reflections have returned from the walls and have not been modified by the absorptions of these walls. Therefore, it is best to run the switching device rapidly in small absorbent rooms and slowly in very large reverberant rooms. The speed of rotation of the switching device must be kept constant during any one set of readings.

In one method of using the improved acoustometer, the time periods during which the sound is being emitted and the intermission periods are of equal length. Referring to Fig. 3 the period of sound emission is $t_1$ the sound building up to intensity $E'_0$. The sound emission is stopped and the measuring device is then turned on for a substantially equal period of time $t_2 - t_3$ after which the sound is emitted for another period of time, etc. The total time of one cycle is designated as T. As it is not desirable, as hereinbefore explained, to turn on the measuring device at the exact instant that the sound emission is stopped there is a slight lapse of time $t_3$, greatly exaggerated in the drawing, during which both the sound source and the measuring devices are disconnected. Likewise there preferably is a slight lapse of time $t_4$ between the shutting off of the measuring device and the turning on of the sound emission device. The meter 10 therefore measures the average sound intensity of shaded areas. As will be later demonstrated mathematically, if $t_3$ and $t_4$ are less than 0.001 second for rooms having periods of reverberation of more than 1/2 second and less than 13 seconds respectively then the error introduced is less than 3 percent and may be disregarded. The sound need not die out completely during a cycle.

Let the reading of the recording meter 10, Fig. 1, be proportional to the average energy in the room during the interval that the meter is operative. If the observation is continued over $n$ cycles, then referring to Fig. 3 the reading of the meter will be proportional to the average ordinate for shaded areas $a_1$, $a_2$, $a_3$, etc., taken over $n$ cycles.

Owing to the exponential form of the curves, it can be demonstrated that the areas $a_1$ are all equal to each other as are the areas $a_2$, $a_3$, etc. Consequently the average energy is expressed mathematically as follows:

$$(3)\quad E\,avg = \frac{1}{nT}\left[\int_{t_3}^{t_2} nE'_0 e^{-Kt}\cdot dt + \right.$$

$$\int_{T+t_3}^{T+t_2}(n-1)E'_0 e^{-Kt}\cdot dt + \cdots\cdots +$$

$$\int_{(n-2)T+t_3}^{(n-2)T+t_2} 2E'_0 e^{-Kt}\cdot dt + \left.\int_{(n-1)T+t_3}^{(n-1)T+t_2} E'_0 e^{-Kt}\cdot dt\right]$$

Where:

$$K = \frac{avs}{4d}$$

Upon integrating Equation (3) between the limits indicated and after applying some straightforward algebraic transformations to the results the equation finally reduces to:

$$(4)\quad E\,avg = \frac{E'_0(e^{-Kt_3} - e^{-Kt_2})}{KT}\cdot$$

$$\left[\frac{1}{1-e^{-KT}} - \frac{e^{-KT}(1-e^{-nKT})}{n(1-e^{-KT})^2}\right]$$

If the observation is continued over a sufficient number of cycles the second term of the bracketed member may be neglected. Assuming this to be the case and replacing $E'_0$ by its value as given in Equation (2), Equation (4) becomes:

$$(5)\quad E\,avg = \frac{E_0(1-e^{-Kt_1})(e^{-Kt_3} - e^{-Kt_2})}{KT(1-e^{-KT})}$$

If $t_3$ is less than .001 second for a room having a reverberation period of .5 second or more and if $t_4$ is less than .001 second for a room having a corresponding period of 13 records or less the total possible error introduced by assuming $e^{-Kt_3}$ equal to unity and $t_2$ equal to $t_1$ will not be more than 3 percent. Making this assumption then and further substituting $2t_1 = T$ Equation (5) becomes:

$$(6)\quad E\,avg = \frac{E_0(1-e^{-Kt_1})}{2Kt_1(1+e^{-Kt_1})}$$

As mentioned above the period of reverberation of a room is by definition the time required for a sound to attenuate to one millionth of its initial intensity in the room. Thus:

$$(7)\quad \frac{E_1}{E_2} = 10^{-6} = e^{13.8} = e^{-Kt_p}$$

Where $t_p$ is the period of reverberation. From (7)

$$(8)\quad t_p = \frac{13.8}{K}$$

From which it is evident that the determination of the value $K$ is all that is required for ascertaining $t_p$.

Equation (6) cannot be solved for the constant $K$ on the basis of a single determination of the average energy $E\,avg$ for a given time adjustment $t_1$, since the equation contains the unknown maximum energy $E_0$. If, however, the speed of the motor 16 is varied thus changing the factors $T_1$, $t_1$, $t_2$, $t_3$ and $t_4$ proportionally in accordance with a different time $t'_1$ and a new value $E'\,avg$ determined, then the value $E_0$ may be eliminated between the equations and the resultant expression solved uniquely for $K$ since $$(9)\quad \frac{E\,avg}{E'\,avg} = \frac{t'_1}{t_1}\cdot\frac{1-e^{-Kt_1}}{1-e^{-Kt'_1}}\cdot\frac{1+e^{-Kt'_1}}{1+e^{-Kt_1}}$$

It is necessary to vary all of the above noted time intervals in the same proportion for making the second measurement in order to render valid the assumptions made in passing from Equations (5) to (6).

In Equation (9) $E\,(avg)$ and $E'\,(avg)$ are read on the meter 10 while $t_1$ and $t'_1$ are known, hence $K$ can be determined and substituted in the formula $$t_p = \frac{13.8}{K}$$

to determine the period of reverberation calculated.

The procedure in the first method therefore, is to run the motor 16 at two different speeds, with the time during which the sound is on being equal to the time during which it is off and the sound is being measured. The average intensity of the decaying sound is read on indicator 10 for the two conditions. The readings and times $t_1$ and $t'_1$ are substituted in Equation (9) and the equation solved for $K$. The period of reverberation is then determined by dividing 13.8 by the value of $K$. The solution for $K$ in Equation (9) is a long and tedious calculation and this method is objectionable for that reason. The solution may be simplified however by the use of graphic methods.

It is also possible to make the average intensity readings during periods when the sound is being emitted in the room and calculate for the period of reverberation in a like manner, since the curves are both logarithmic and obey the same law as hereinbefore described.

In my preferred method the periods of sound emission and intermission need not be of equal length. Preferably the decay period is longer than the emission period to give more accurate results. A graph illustrating the principles of the preferred method is shown in Fig. 4. As in the method previously described, the decaying sound is measured after the sound is no longer being emitted. However, the time $t_3$ may be any convenient length of time and need not be less than 0.001 second. It should be long enough to prevent the contact disturbances from affecting the meter reading as hereinbefore explained. The intensity of the decaying sound is measured during the time $t_2-t_3$, the average intensity of the sound during this period being equal to the average ordinate of the shaded portions $b_1+b_2$. After this measurement is taken, the time interval between the shutting off of the sound and turning on of the measuring device is changed by a known amount $t'$ by changing the relative positions of cams 13 and 14 on shaft 15 as explained above, and a second reading is taken. Since this reading is taken over another portion of the decaying sound curve and is taken over an exactly equal interval of time $t'_2-t'_3=t_2-t_3$ as the first reading, the shape of the cams and the speed of the variable motor not being changed, the reading will have a different value represented by the average ordinate of the shaded areas $b_2+b_3$. In a reverberant room this value will be slightly different, while in a non-reverberant room it will be much different than the original reading since in a non-reverberant room the decaying curve drops toward zero at a much faster rate. The ratio of the two readings in this case is sufficient to determine the period of reverberation of the room directly as will be demonstrated mathematically as follows:

Referring back to Equation (5) the first measurement is taken based on the time intervals $t_1$, $t_2$, $t_3$ and T. For the second measurement the cam 13 is adjusted to increase the interval $t_3$ and to delay the starting time for the measuring interval by the same amount, namely $t'$. Thus if the proper time intervals and the corresponding energy measurements E avg and E' avg for the first and second measurements are substituted in Equation (5) and the resultant equation expressing the first measurement is divided by that expressing the second measurement the following result is obtained.

$$(10) \quad \frac{E\ avg}{E'\ avg}=e^{-Kt'}$$

from which the value of K may be easily determined and correspondingly the reverberation period $t_p$ from Equation (8) above or more simply as expressed in logarithms to the base 10.

$$(11) \quad t_p=\frac{6t'}{\log_{10}\left(\frac{E\ avg}{E'\ avg}\right)}$$

The period of reverberation is determined by my preferred method by substituting the values of $t'$ and the readings of the instrument 10 in Equation 11 which then may be solved quickly.

It is obvious that it is possible also to obtain the period of reverberation if the two displaced sound mensuration periods are of unequal length. This makes the mathematics much more complicated. It is also obvious that the two average readings may be obtained on the sound emission part of the curve of Fig. 4 since both the building up and decay curves are logarithmic and obey the same law. However, there is a much greater chance for error if the readings are taken when the loud speaker is emitting sound unless great care is taken in placing the loud speaker relative to the sound pickup device.

If the instrument is used for actually determining the points on the logarithmic curve $$E'_0=E_0e^{-\left(\frac{avst}{4d}\right)}$$

for any room, the average intensity is determined at a succession of points representing slight increments of time after the sound emission is stopped. The acoustometer reading is plotted directly against time.

By introducing various sound absorbers or quantities of absorber into the room and repeating the operation it becomes possible to demonstrate graphically the effect of varying amounts of absorber and also calculate the sound-absorbing value of the materials under observation.

Where a tone of constant frequency is emitted from a stationary source A, sound patterns or interference phenomena are apt to occur in the room under measurement, which, of course cause erroneous readings. In accordance with the present invention, the preferred method for overcoming such objectionable effects, is to provide means in oscillator 1 for causing a slight frequency variation or tremolo in the tone emitted. As is well known to those skilled in the art, this may be accomplished by causing a slight variation of the inductance or capacity of the resonant circuit associated with the oscillator.

Referring back for a moment to Fig. 1, the time intervals of sound emission and measurement may be adjusted relatively by changing the peripheral settings of switches 4 and 8 instead of by changing the relative angular settings of the cams 13 and 14.

In determining the reverberation period in accordance with the procedure outlined in connection with Fig. 4, it is not essential that the measuring intervals be so chosen as to overlap as indicated by the shaded portions $b_2$, but may equally well be selected for measuring the average intensities under distinct portions of the sound decay curves.

I claim:

1. The step in the method of determining the period of reverberation of a room which comprises causing the average intensity of sound to be suitably indicated during a predetermined period of time when the sound is varying logarithmically.

2. The step in the method of determining the period of reverberation of a room which comprises causing the average intensity of residual sound to be suitably indicated during a predetermined portion of the period of decay of said residual sound.

3. The steps in the method of determining the period of reverberation of a room which comprises first causing the average intensity of sound to be suitably indicated during a predetermined period of time when the sound is varying logarithmically and then causing the average intensity of said sound to be suitably indicated during a different predetermined equal period of time.

4. The steps in the method of determining the period of reverberation of a room which comprise first causing the average intensity of residual sound to be suitably indicated during a predetermined portion of the period of decay of said residual sound, and then causing the average intensity of said residual sound to be suitably indicated during a different period of sound decay.

5. The steps in the method of determining the period of reverberation of a room which comprise first causing the average intensity of residual sound to be suitably indicated during a predetermined portion of the period of decay of said residual sound, and then causing the average intensity of residual sound to be suitably indicated during a different predetermined portion of the period of decay of residual sound resulting from a sound identical with that made for the first said indication, the length of time during which both said indications of average sound intensities are made being equal.

6. The step in the method of determining the period of reverberation of a room which comprises emitting in said room a rapid succession of sounds of short and equal duration and equal intensity, the successive intermission periods of residual sound decay all being of equal duration.

7. The steps in the method of determining the period of reverberation of a room which comprise emitting in said room a rapid succession of sounds of short and equal duration and equal intensity, the successive intermission periods of residual sound decay all being of equal duration, and causing the average intensity of the sound to be suitably indicated in said room while it is varying logarithmically.

8. The steps in the method of determining the period of reverberation of a room which comprise emitting in said room a rapid succession of sounds of short and equal duration and equal intensity, the successive intermission periods of residual sound decay all being of equal duration, and causing the average intensity of the residual sound to be suitably indicated during a predetermined interval of said intermission periods.

9. The steps in the method of determining the period of reverberation of a room which comprise emitting in said room a rapid succession of sounds of short and equal duration, the successive intermission periods of residual sound decay all being of equal duration, first causing the average intensity of the residual sound to be suitably indicated during a predetermined portion of said intermission periods and then causing the average intensity of the residual sound to be suitably indicated during another predetermined portion of said intermission periods.

10. The steps in the method of determining the period of reverberation of a room which comprise emitting in said room a rapid succession of sounds of short and equal duration and equal intensity, the successive intermission periods of residual sound decay all being of equal duration, first causing the average intensity of the residual sound to be suitably indicated during a predetermined portion of said intermission periods, and then causing the average intensity of the residual sound to be suitably indicated during another predetermined portion of said intermission periods, the length of time during which both indications are effected being equal, and the average intensities being indicated during those portions of sound decay during which the average intensities vary appreciably.

11. The method of determining the period of reverberation of a room which comprises emitting in said room a rapid succession of sounds of short and equal duration and equal intensity, the successive intermission periods of residual sound decay all being of equal duration, first causing the average intensity of the residual sound to be suitably indicated during a predetermined portion of said intermission periods and then causing the average intensity of the residual sound to be suitably indicated during another predetermined portion of said intermission periods, the length of time during which both said indications are made being equal, and substituting the average sound intensities in the equation $$t_p = \frac{6t'}{\log_{10}\left(\dfrac{E\ avg}{E'\ avg}\right)}$$

in which $t_p$ is the period of reverberation in seconds, $t'$ is the time in seconds between said predetermined portions of the intermission periods when said residual sound is indicated, $E\ avg$ being the reading of the indicating device of the larger average residual sound intensity, and $E'\ avg$ being the reading of the indicating device of the smaller average residual sound intensity.

12. The steps in the method of determining the period of reverberation of a room which comprise emitting in said room a rapid succession of sounds of short and equal duration and equal intensity, the successive intermission periods of residual sound decay all being of equal duration, the total length of cycle of successive sound and intermission periods varying from 1/5 ot 5 seconds and being in proportion to the size of said room, and causing the average intensity of the residual sound to be suitably indicated only during a predetermined period during said intermission periods.

13. The steps in the method of determining the period of reverberation of a room which comprise emitting in said room a rapid succession of sounds of short and equal duration and equal intensity, the successive intermission periods of residual sound decay all being of equal duration, the intermission periods being longer than the periods of sound emission, first causing the average intensity of the residual sound to be suitably indicated during a predetermined portion of said intermission periods, and then causing the average intensity of the residual sound to be suitably indicated during another predetermined portion of said intermission periods.

14. An acoustometer consisting essentially of the combination of a constant-intensity sound-emitting means, means to interrupt said sound-emitting means to produce a rapid succession of sounds of short and equal duration and intermission periods of short and equal duration, and means in combination with a sound-measuring device and said interrupting means to turn on said sound-measuring device during any predetermined portion of each cycle of sound emission and intermission.

15. In an acoustometer, the combination of a constant-intensity sound-emitting means and means to periodically interrupt said sound-emitting means to produce a rapid succession of sounds of short and equal duration and intermission periods of short and equal duration.

16. In an acoustometer, the combination with means to produce a rapid succession of sounds of short and equal duration and intermission periods of short and equal duration, of means comprising a acousti-electrical device in combination with a switching device adapted to indicate the average sound intensity during any predetermined portion of said sound emission or intermission periods.

17. In an acoustometer, the combination with a constant-intensity sound-emitting means, of means to interrupt said sound-emitting means to produce a rapid succession of sounds of short and equal duration and intermission periods of short and equal duration, and switching means adapted to operate a sound measuring device during a predetermined portion of said sound emission or intermission periods, said switching means so operating said sound measuring device as to prevent errors in measurement due to transient electrical disturbance.

18. In an acoustometer, the combination of a constant-intensity sound-emitting means, means to interrupt said sound-emitting means to produce a rapid succession of sounds of short and equal duration and intermission periods of short and equal duration, and means in combination with a sound-measuring device to short circuit the sound pick-up device while said sound emitting means is operating.

19. The steps in the method of determining the period of reverberation of a room which comprise, emitting in said room a rapid succession of sounds of short and equal duration and equal intensity, said sounds varying in frequency during emission for preventing in said room the occurrence of sound patterns, the successive intermission periods of residual sound decay all being of equal duration, and causing the average intensity of the residual sound to be suitably indicated during a predetermined interval of said intermission periods.

20. The steps in the method of determining the period of reverberation of a room which comprise emitting in said room a rapid succession of sounds of short and equal duration and equal intensity, said sounds varying in frequency during emission for preventing in said room the occurrence of sound patterns, the successive intermission periods of residual sound decay all being of equal duration, first causing the average intensity of the residual sound to be suitably indicated during a predetermined portion of said intermission periods, and then causing the average intensity of the residual sound to be suitably indicated during another predetermined portion of said intermission periods, the length of time during which both said indications are made being equal, and the average intensities being indicated during those portions of sound decay during which the average intensities vary appreciably.

21. The method of determining the period of reverberation of a room which comprises emitting in said room a rapid succession of sounds of short and equal duration and equal intensity, said sounds varying in frequency during emission for preventing in said room the occurrence of sound patterns, the successive intermission periods of residual sound decay all being of equal duration, first causing the average intensity of the residual sound to be suitably indicated during a predetermined portion of said intermission periods and then causing the average intensity of the residual sound to be suitably indicated during another predetermined portion of said intermission periods, the length of time during which both said indications are made being equal, and substituting the average sound intensities in the equation $$t_p = \frac{6t'}{\log_{10}\left(\frac{E\ avg}{E'\ avg}\right)}$$

in which $t_p$ is the period of reverberation in seconds, $t'$ is the time in seconds between said predetermined portions of the intermission periods when said residual sound is indicated, $E\ avg$ being the reading of the indicating device of the larger average residual sound intensity, and $E'\ avg$ being the reading of the indicating device of the smaller average residual sound intensity.

22. In an acoustometer, the combination with means to produce a rapid succession of sounds of short and equal duration and intermission periods of short and equal duration, of means to vary the frequency of said sounds during emission, and means comprising an acousti-electrical device in combination with switching means adapted to indicate the average sound intensity during any predetermined portion of said sound emission or intermission periods.

In testimony whereof I affix my signature.

CLARENCE A. ANDREE.